United States Patent
Wei et al.

(10) Patent No.: US 6,198,620 B1
(45) Date of Patent: Mar. 6, 2001

(54) ULTRACAPACITOR SEPARATOR (75) Inventors: Chang Wei, Niskayuna; Elihu Calvin Jerabek, Glenmont; Oliver Harris LeBlanc, Jr., Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/162,531

(22) Filed: Sep. 29, 1998

(51) Int. Cl.$^7$ ....................................... H01G 9/00
(52) U.S. Cl. .......................... 361/502; 361/503; 29/25.03
(58) Field of Search .................... 361/502, 503, 361/504, 505, 508; 29/25.03, 25.41

(56) References Cited

U.S. PATENT DOCUMENTS

| | | | |
|---|---|---|---|
| 3,652,902 | * 3/1972 | Hart et al. ............................. | 361/502 |
| 3,700,975 | * 10/1972 | Butherus et al. ..................... | 317/230 |
| 4,542,444 | * 9/1985 | Boland ................................. | 361/502 |
| 4,775,582 | 10/1988 | Abba et al. . | |
| 4,803,597 | 2/1989 | Watanabe et al. . | |
| 4,987,024 | * 1/1991 | Greenberg et al. .................. | 428/219 |
| 5,075,990 | * 12/1991 | Greenberg et al. .................. | 38/44 |
| 5,136,472 | 8/1992 | Tsuchiya et al. . | |
| 5,150,283 | 9/1992 | Yoshida et al. . | |
| 5,158,647 | * 10/1992 | Hurley ................................. | 162/138 |
| 5,336,274 | * 8/1994 | Mayer et al. ........................ | 29/623.4 |
| 5,416,170 | * 5/1995 | Rhee et al. ........................... | 524/398 |
| 5,420,747 | 5/1995 | Ivanov et al. . | |
| 5,464,453 | 11/1995 | Tong et al. . | |
| 5,589,299 | 12/1996 | Yamada et al. . | |
| 5,621,607 | * 4/1997 | Farahmandi et al. ............... | 361/502 |
| 5,679,479 | 10/1997 | Young et al. . | |
| 5,700,599 | 12/1997 | Danko et al. . | |
| 5,700,600 | 12/1997 | Danko et al. . | |
| 5,726,856 | 3/1998 | King, Jr. et al. . | |

FOREIGN PATENT DOCUMENTS 11486  4/1996  (WO) .

OTHER PUBLICATIONS

"Mobility and Ionic Association of Lithium Salts in a Propylene Carbonate–Ethyl Methyl Carbonate Mixed Solvent", Ue & Mori, Electrochem. Soc., vol. 142, No. 8, Aug. 1995.

* cited by examiner

Primary Examiner—Kristine Kincaid
Assistant Examiner—Eric Thomas
(74) Attorney, Agent, or Firm—Noreen C. Johnson; Douglas E. Stoner (57) ABSTRACT

An ultracapacitor includes two solid, nonporous current collectors, two porous electrodes separating the collectors, a porous separator between the electrodes and an electrolyte occupying the pores in the electrodes and separator. The electrolyte is a polar aprotic organic solvent and a salt. The porous separator comprises a wet laid cellulosic material.

16 Claims, 5 Drawing Sheets fig. 1 fig. 2 fig. 3 fig. 4 fig. 5 fig. 6 fig. 7

ULTRACAPACITOR SEPARATOR

This invention was made with government support under Contract No. 38-83CH10093 awarded by DOE. The government may have certain rights in the invention.

BACKGROUND OF THE INVENTION

Capacitors are storage devices that store electrical energy on an electrode surface. Electrochemical cells create an electrical charge at electrodes by chemical reaction. The ability to store or create electrical charge is a function of electrode surface area in both applications. Ultracapacitors, sometimes referred to as double layer capacitors, are a third type of storage device. An ultracapacitor creates and stores energy by microscopic charge separation at an electrical chemical interface between electrode and electrolyte.

Ultracapacitors are able to store more energy per weight than traditional capacitors and they typically deliver the energy at a higher power rating than many rechargeable batteries. Ultracapacitors comprise two porous electrodes that are isolated from electrical contact by a porous separator. The separator and the electrodes are impregnated with an electrolytic solution, which allows ionic current to flow between the electrodes while preventing electronic current from discharging the cell. Each electrode is in intimate contact with a current collector. One purpose of the current collector is to reduce ohmic loss. If the current collectors are nonporous, they can also be used as part of the capacitor case and seal.

When electric potential is applied to an ultracapacitor cell, ionic current flows due to the attraction of anions to the positive electrode and cations to the negative electrode. Upon reaching the electrode surface, the ionic charge accumulates to create a layer at the solid liquid interface region. This is accomplished by absorption of the charge species themselves and by realignment of dipoles of the solvent molecule. The absorbed charge is held in this region by opposite charges in the solid electrode to generate an electrode potential. This potential increases in a generally linear fashion with the quantity of charge species or ions stored on the electrode surfaces. During discharge, the electrode potential or voltage that exists across the ultracapacitor electrodes causes ionic current to flow as anions are discharged from the surface of the positive electrode and cations are discharged from the surface of the negative electrode while an electronic current flows through an external circuit between electrode current collectors.

In summary, the ultracapacitor stores energy by separation of positive and negative charges at the interface between electrode and electrolyte. An electrical double layer at this location consists of sorbed ions on the electrode as well as solvated ions. Proximity between the electrodes and solvated ions is limited by a separation sheath to create positive and negative charges separated by a distance which produces a true capacitance in the electrical sense.

During use, an ultracapacitor cell is discharged by connecting the electrical connectors to an electrical device such as a portable radio, an electric motor, light emitting diode or other electrical device. The ultracapacitor is not a primary cell but can be recharged. The process of charging and discharging may be repeated over and over. For example, after discharging an ultracapacitor by powering an electrical device, the ultracapacitor can be recharged by supplying potential to the connectors.

The physical processes involved in energy storage in an ultracapacitor are distinctly different from the electrochemical oxidation/reduction processes responsible for charge storage in batteries. Further unlike parallel plate capacitors, ultracapacitors store charge at an atomic level between electrode and electrolyte. The double layer charge storage mechanism of an ultracapacitor is highly efficient and can produce high specific capacitance, up to several hundred Farads per cubic centimeter.

A major advantage of an ultracapacitor is its ability to deliver electrical energy at high power rating. A high power operation is predicated on a low internal resistance. Hence, ultracapacitor separators are made of highly porous materials that provide minimal resistance to electrolyte ion movement and that at the same time, provide electronic insulator properties between opposing electrodes. Further, the separators must be cost effective to provide a commercial ultracapacitor.

Various materials have been used as separators in ultracapacitors, including (1) aquagel and resorcinol formaldehyde polymer, (2) polyolefin film, (3) nonwoven polystyrene cloth (4) acrylic resin fibers and (5) nonwoven polyester film. Other materials such as porous polyvinyl chloride, porous polycarbonate membrane and fiberglass paper are suitable as separators for ultracapacitors. Some separator materials such as polyesters, show high ionic resistance in nonaqueous electrolyte because of poor wettability by organic solvents such as propylene carbonates. On the other hand, some of the separator materials demonstrate good features as separators in nonaqueous electrolyte but are too expensive for commercialization. The present invention relates to a separator material that is reasonable in cost and that exhibits good performance for a nonaqueous ultracapacitors. The separator material of the present invention has excellent mechanical strength that is improved by wetting with electrolyte. These properties are important for ultracapacitors because a separator must possess good mechanical integrity for handling during fabrication and wetability to electrolyte to achieve a low resistance in completed cells. According to the present invention, stacks of bipolar configured ultracapacitor cells can be easily fabricated. The stacks are characterized by an increased energy density.

SUMMARY OF THE INVENTION

The invention relates to an ultracapacitor and to a method of making an ultracapacitor. The ultracapacitor of the invention comprises at least one cell comprising two solid, nonporous current collectors, two porous electrodes separating the collectors, a porous separator between the electrodes and an electrolyte occupying the pores in the electrodes and separator. The electrolyte comprises a polar aprotic organic solvent and a salt. The porous separator comprises a cellulosic tissue material. The invention also relates to a stack of ultracapacitor cells having at least one separator layer comprising a cellulosic tissue material.

The method of the invention comprises providing a multilayer structure comprising two solid, nonporous current collectors, two porous electrodes separating the current collectors, a porous separator between the electrodes and an electrolyte occupying the pores in the electrodes and separator. The electrolyte comprises a polar aprotic organic solvent and a salt. The porous separator layer comprises a cellulosic tissue material. The multilayer structure is sealed to form the ultracapacitor.

In another aspect, the invention relates to a method of making a stack of ultracapacitor cells. In this method, a plurality of bipolar double layer ultracapacitor cells is provided in stacked relationship. At least one cell comprises porous, oppositely charged electrodes with a cellulosic tissue material separator disposed between the electrodes. A non-porous current collector is provided between each cell with each current collector having adjoining polarized electrodes of different cells bonded thereto. The electrodes and separators are saturated with electrolyte and the cells, current collectors and separators are sealed to form the stack of ultracapacitor cells.

DETAILED DESCRIPTION OF THE INVENTION

Figure 1:
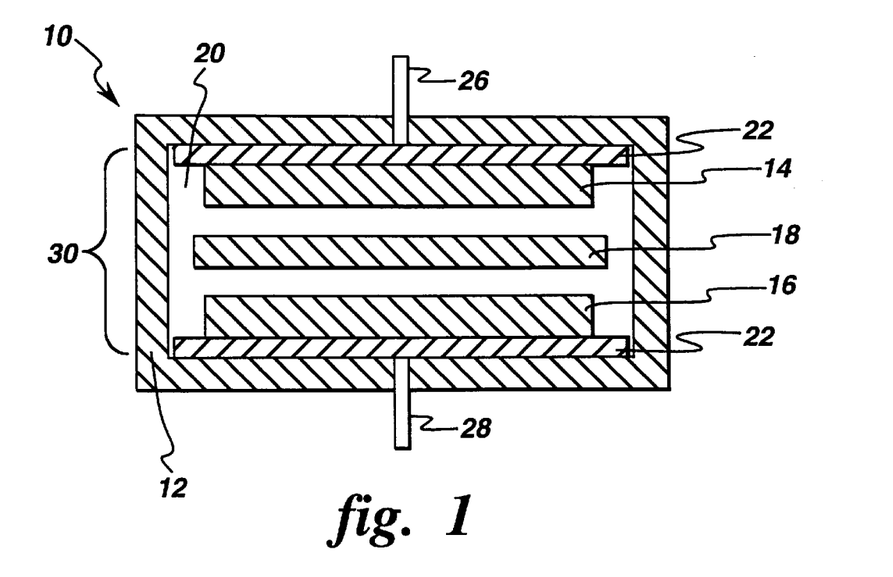
FIG. 1 is a front sectional view of an ultracapacitor.
Figure 2:
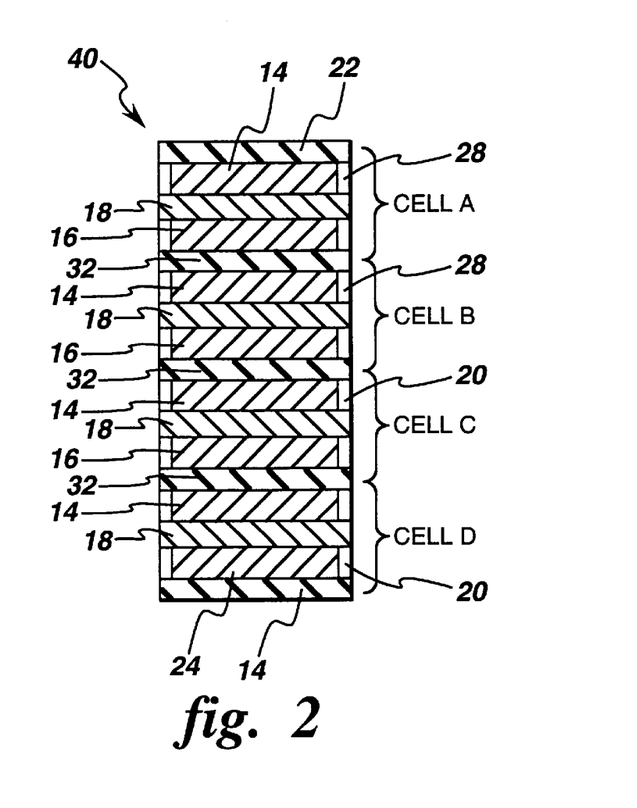
FIG. 2 is a front sectional view of a series stack of ultracapacitor cells.

The separator of the invention may be used in a wide variety of ultracapacitors such as described in U.S. Pat. Nos. 5,464,453; 5,420,747; 5,150,283; 5,136,472; and 4,803,597; as well as PCT Application WO96/11486 (PCT/US95/12772; Apr. 18, 1996), all of which are incorporated herein by reference. FIGS. 1 and 2 herein, are based on PCT Application WO 96/11486 and show a non-limiting example of an ultracapacitor of the present invention.

In all of the Figures of this application, like structures are identified by the same numbers.

Referring to FIG. 1, ultracapacitor 10 includes an enclosing body 12, a pair of electrodes 14 and 16, an electronic porous separator layer 18, an electrolyte 20, a pair of conductive layers which are current collector plates 22 and 24 and electrical leads 26 and 28, extending from the current collector plates 22 and 24. One of the pair of current collector plates 22 and 24 is attached to the back of each electrode 14 and 16. Preferably, the current collector plates 22 and 24 are thin layers of aluminum foil.

The electronic porous separator layer 18 is a cellulosic tissue material. The preferred cellulosic tissue materials are wet wipes made from cellulosic fibers. Kimwipes® (Kimberly-Clark Corporation, Roswell, Ga.) tissues are a preferred cellulosic tissue material. Kimwipes® tissues are wet laid tissues with randomly oriented cellulosic fibers. According to the present invention, Kimwipes® tissues have been found to have excellent wet strength in an aprotic electrolyte environment.

The current collectors 22, 24 commonly are made of aluminum because of its conductivity and cost. In the drawings, the current collectors 22 and 24 are thin layers of aluminum foil. However, the electrodes can be any suitable conductive material.

Exemplary organic solvents for electrolyte 20 include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. Preferably, the electrolyte 20 includes a polar aprotic organic solvent such as a cyclic ester, chain carbonate, cyclic carbonate, chain ether and/or cyclic ether solvent and a salt. Preferred cyclic esters are esters having 3 to 8 carbon atoms. Examples of the cyclic esters include -butyrolactone, -butyrolactone, -valerolactone and -valerolactone. The chain carbonates are preferred to be carbonates having 3 to 8 carbon atoms. Examples of the chain carbonates include dimethyl carbonate, diethyl carbonate, dipropyl carbonate, methyl ethyl carbonate, methyl propyl carbonate and ethyl propyl carbonate. The preferred cyclic carbonates have 5 to 8 carbon atoms. Examples of the cyclic carbonates include 1,2-butylene carbonate, 2,3-butylene carbonate, 1,2-pentene carbonate, 2,3-pentene carbonate and propylene carbonate. The preferred chain ethers have 4 to 8 carbon atoms. Examples of the chain ethers include dimethoxyethane, diethoxyethane, methoxyethoxyethane, dibutoxyethane, dimethoxypropane, diethoxypropane and methoxyethoxypropnane. The preferred cyclic ethers have 3 to 8 carbon atoms. Examples of the cyclic ethers include tetrahydofuran, 2-methyl-tetrahydrofuran, 1,3-dioxolan, 1,2-dioxolan, 2-methyldioxolan and 4-methyl-dioxolan.

Suitable electrolyte salts include quatenary ammonium salts such as tetraethylammonium tetraflouroborate (($Et)_4$ $NBF_4$), hexasubstituted guanidinium salts such as disclosed in U.S. Pat. No. 5,726,856, the disclosure of which is incorporated herein by reference, and lithium salts such as disclosed by Ue et al., Mobility and Ionic Association of Lithium Salts in a Propylene Carbonate-Ethyl Carbonate Mixed Solvent, *Electrochem. Soc.*, vol. 142, No. 8, August 1995, the disclosure of which is incorporated herein by reference.

In a preferred embodiment, the electrodes 14, 16 in FIG. 1, are both carbon electrodes on aluminum current collectors. The electrode can be fabricated by a forming process or by pressing electrode materials in a die and slurry pasting or screen printing carbon as a paste with a liquid phase binder/fluidizer. The liquid phase may be water or an electrolyte solvent with or without a thinner such as acetone. Both dry and wet electrode formations may include a binder such as polymers, starches, Teflon® particles or Teflon® dispersions in water. In a preferred embodiment, an electrode is formed on the cellulosic tissue separator of the present invention. A stack of ultracapacitor cells can then be assembled by pressing an electrode coated separator against each side of a current collector.

The enclosing body 12 can be any known enclosure means commonly used with ultracapacitors. It is an advantage to minimize the weight of the packaging means to maximize the energy density of the ultracapacitor. Packaged ultracapacitors are typically expected to weigh 1.25 to 2 times more than the unpackaged ultracapacitor. The electrical leads 26 and 28 extend from the current collectors 22 and 24 through the enclosing body 12 and are adapted for connection with an electrical circuit (not shown).

Ultracapacitor 10 of FIG. 1 includes a bipolar double layer cell 30 that includes two solid, nonporous current collectors 22, 24, two porous electrodes 14, 16 separating the current collectors 22, 24 and a porous separator 18 between the electrodes 14, 16 and an electrolyte 20 occupying pores in the electrodes 14, 16 and separator 18. Individual ultracapacitor cells can be stacked in series to increase operating voltage. The optimum design is to have adjacent cells separated with only a single current collector. This collector is nonporous so that no electrolytic solution is shared between cells. This type of design is called bipolar and is illustrated in FIG. 2 of the drawings. In a bipolar double layer capacitor, one side of the current collector contacts a positive electrode and the other side contacts a negative electrode of an adjacent cell. A series stack 40 of the high performance bipolar double layer cells 30 (A, B, C and D) is illustrated in FIG. 2. In FIG. 2, each pair of polarized carbon electrodes, 14, 16 is separated with a separator 18. A current collector 32 is attached at one surface to charged electrode 14 of a first cell. Attached to an opposite surface of the current collector 32, is an oppositely charged electrode 16 of a second cell. If one side of the current collector 32 is in contact with the negative electrode for a first capacitor cell "A," then the other side of the same current collector 32 is in contact with a positive electrode for an adjacent cell "B." A sufficient amount of an electrolyte 20 is introduced such that the electrolyte 20 saturates the electrodes 14 and 16 and separator 18 within each cell. Exterior current collectors 22 and 24 are placed at each end of the stack.

The internal current collectors 32 of the series stack of cells are preferably nonporous layers of aluminum foil designed to separate the electrolyte 20 between adjacent cells. The exterior current collectors are also nonporous such that they can be used as part of the external capacitor case seal, if necessary. The electronic separator 18 is located between the opposing carbon electrodes 14 and 16 within a particular capacitor cell. The electronic separator 18 allows ionic conduction via charged ions in the electrolyte.

The ultracapacitor cell can be constructed by placing the layers of conductor, electrode and separator along with electrolyte within an enclosing body. The structure can then be subjected to pressure to seal the layers within the enclosing body. Alternatively, the enclosing body can be subjected to pressure and vacuum. The vacuum acts to remove gases while the ultracapacitor is sealed. Alternatively, the ultracapacitor cell can be constructed by providing adhesive between layers and applying pressure and or heat throughout the adhesive to seal the cell.

Figure 3:
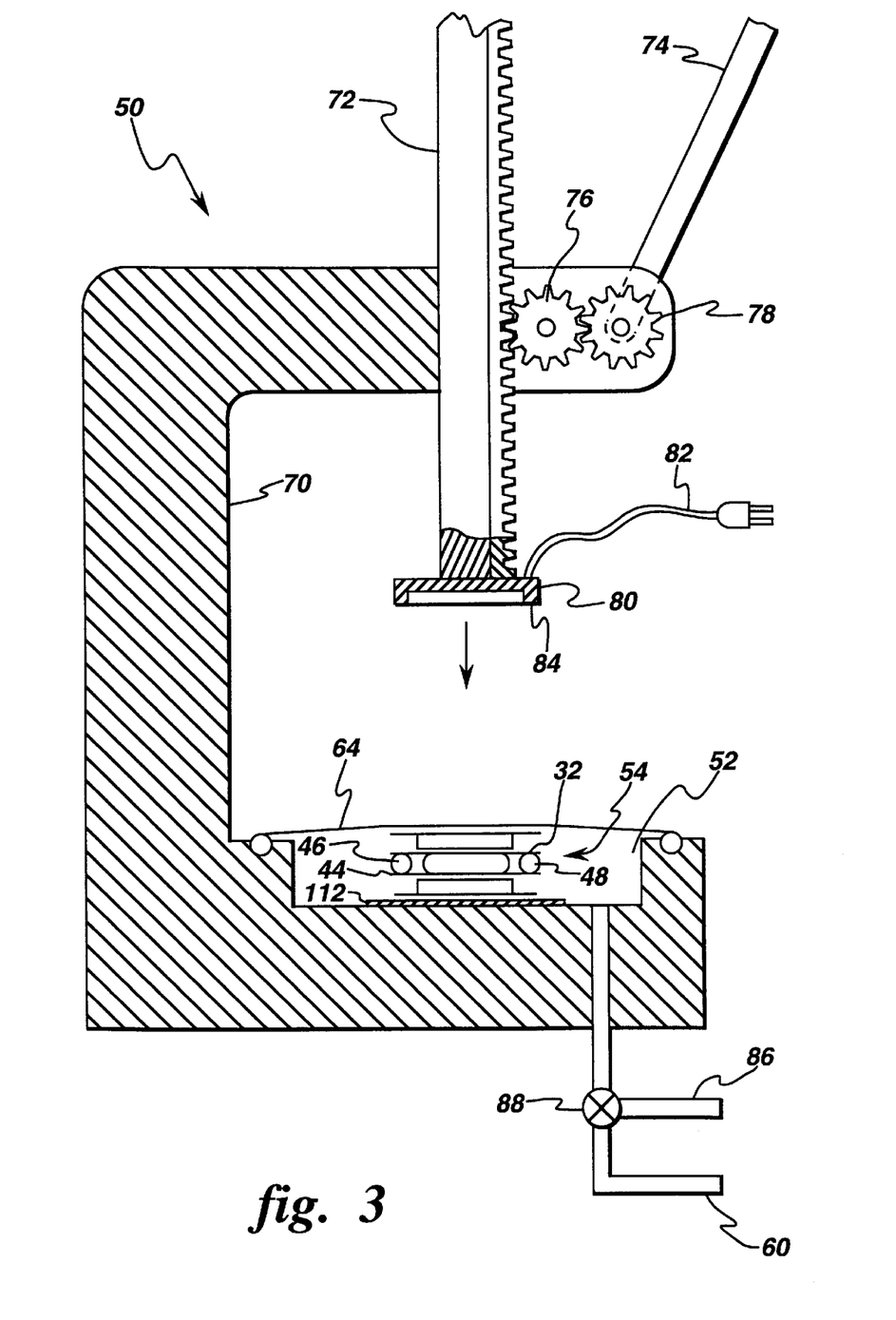
FIG. 3 is a cross-sectional view of an exemplary apparatus for sealing an ultracapacitor.

FIG. 3 depicts one, non-limiting illustration of an apparatus and method of sealing an ultracapacitor or series stack of ultracapacitor cells according to the present invention. Referring to FIG. 3, structure 50 is a frame, platform, or other construction but is often a press as described below. An enclosable region is depicted in FIG. 3 as recess 52, in which an ultracapacitor series stack 40 is disposed. The embodiment illustrated in FIG. 3 permits application of vacuum while the ultracapacitor is being sealed. Primary vacuum tube 60 communicates with recess 52. A collapsible membrane 64 can be fastened over the ultracapacitor to maintain a vacuum while the cell is being sealed by pressing.

Figure 4:
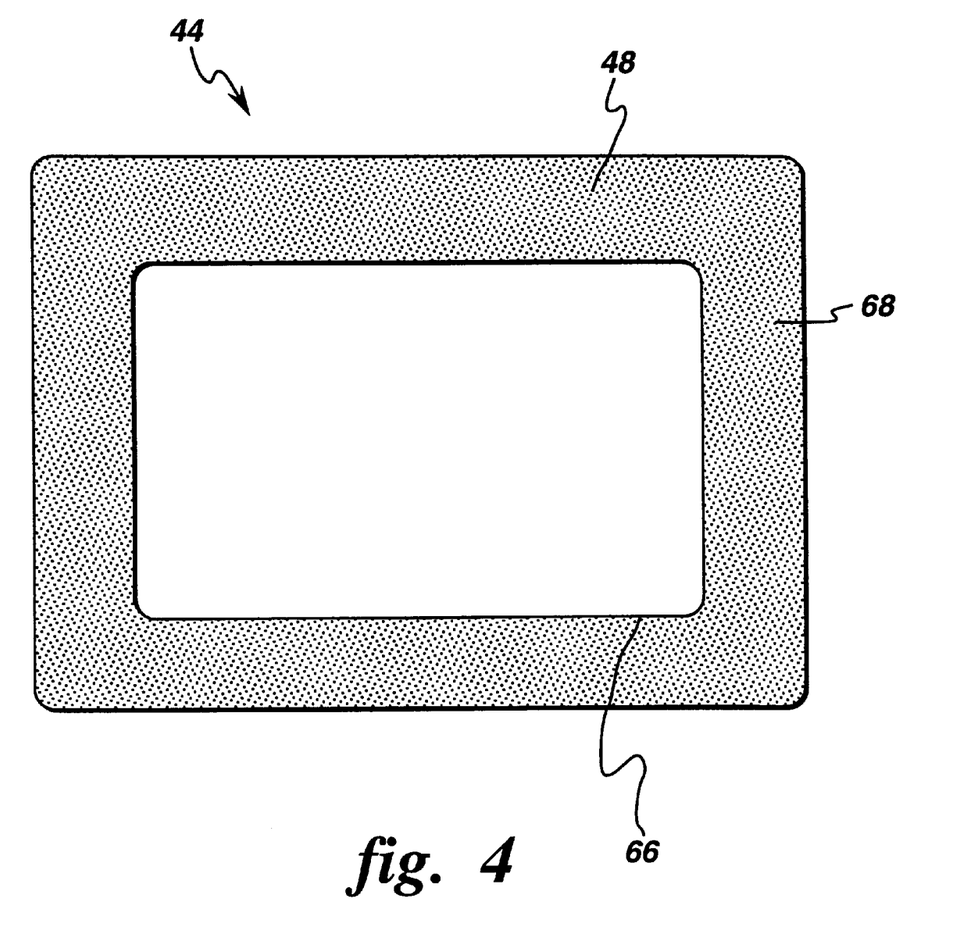
FIG. 4 is a top cross-sectional view of a separator of a sealed ultracapacitor.

FIG. 3 shows an ultracapacitor cell disposed in the recess area of the press 50. The cell includes a separator system, comprising an upper separator layer 42 and a lower separator layer 44. Sealant portions 46 and 48 are disposed in a peripheral area between the bottom surface of separator 42 and the top surface of separator 44. "Peripheral" refers to the boundary area of the separator layers. In general, this area should be as small as possible. This boundary area is designated as element 68 in FIG. 4. FIG. 4 provides a top, cross-sectional view of a separator layer similar to layer 44 of FIG. 3, after sealant has spread to some extent by the action of pressure and, optionally, heat, as described below. The boundary area 68 surrounds the primary section 66 of a separator layer.

Many different types of sealants can be used in the present invention and the term is meant to encompass, "glues", or "pastes." Sealants are described, for example, in the *Kirk-Othmer Encyclopedia of Chemical Technology,* 3rd Edition, Vol.1, pp.488–508 (1978), and in *The Condensed Chemical Dictionary,* 10th Edition, 1981, Van Nostrand Reinhold Company. In general, the selected sealant should be chemically resistant to electrolyte. It should also be capable of withstanding operating temperatures of the ultracapacitor without substantial degradation. Moreover in those embodiments where the sealant contacts the separators, it should be capable of flowing through the thickness of the separator layers. Once cured, the sealant should be substantially impermeable to the flow or passage of electrolyte.

Heat-curable sealants may be used in some embodiments. Moisture-cured sealants or externally-cured materials may be used. Other embodiments may use air-curable or pressure-sensitive sealants, such as "hot melt" glues. Illustrative sealants include those based on acrylic, ethylene such as ethylene vinyl acetate (EVA) copolymer, silicone, rubber, epoxy materials, or combinations of these materials. Commercial examples include the materials commonly referred to as "hot glues."

The sealants are usually in the form of liquids, pastes, or solids. A sealant may be applied to one or both of the facing surfaces of the separators or other surfaces. Many techniques are available for applying sealant. Known application techniques include the use of a spatula, brush, roller, spray, or glue gun. As one example, a bead, strip or "ring" of sealant is applied along the peripheral area 68 of one of the separator layers. Alternatively, individual droplets of sealant can be deposited at sites in the peripheral area 68 with the droplets flowing and covering the peripheral area 68 upon the application of pressure, vacuum and/or heat. As yet another alternative, at least one of the separator layers 18 can be pre-impregnated with sealant. All of these techniques cause the sealant to form a continuous layer. In general, the particular method of deposition is not critical, as long as the sealant is applied to locations where it will eventually form a seal after pressure or vacuum is released. The ultracapacitor becomes sealed by a barrier which is perpendicular to the horizontal capacitor layers which are encased in the barrier.

A compressive force is applied to promote the flow of the sealant-especially in the case of sealant compositions with very high softening points or glass transition temperatures, such as the EVA based types. Compression can be applied indirectly to the sealant through upper ultracapacitor layers by means of the mechanical press 50 of FIG. 3. Other devices to seal an ultracapacitor include an hydraulic press or pneumatic press or any device for applying compressive force. The press 50 of FIG. 3 includes structural frame 70 and adjustable beam 72. The length of beam 72 moves in a direction perpendicular to the base portion of the structural frame as controlled by the selective action of hand lever 74 and gears 76 and 78. Compression element 80 is detachably attached as the base of beam 72. Bottom surface 84 can be similar in shape to the peripheral area of the top planar surface of ultracapacitor 40. The force applied by the press should be sufficient to cause the sealant to become substantially fluid, to flow and form a continuous bead or strip around the peripheral area of the layer on which it is deposited. Thus, the particular press force depends in large part on the nature of the sealant. In general, the pressure will be in the range of about 1 psi to about 1,000 psi and preferably, in the range of about 10 psi to about 100 psi. A lower press force will be suitable for lower viscosity sealants and a higher press force will be required for higher viscosity materials.

The sealant can be heated while being compressed. Heating enhances the flow characteristics of the sealant. Heating temperature should be sufficient to soften the sealant. Preferably, the temperature is high enough to melt the sealant. For a sealant made from an EVA based material, a suitable temperature will be in the range of about 100° C. to about 300° C.

Heat is applied to the sealant in the press 50 of FIG. 3 by means of a standard electrical heating element that is encased within element 80 and is connected to an electrical outlet by way of cord 82. The bottom surface 84 of element 80 has a shape that aligns with sealant-containing peripheral regions of ultracapacitor 10. Thus, when compression element 80 is lowered for compression of the ultracapacitor through membrane 64, heat is transmitted primarily to the sealant containing regions.

A vacuum can be applied to press together the layers of the ultracapacitor and to evacuate ambient gasses from the internal region of the cell structure. In FIG. 3, vacuum tube 60 is connected to a vacuum source through vacuum valve 88 with backfill vacuum tube 86. When vacuum is applied, the collapsible membrane 64 is positioned over recess 52. The membrane 64 maintains the vacuum within the recess and transmits the applied compressive force to the layers of the ultracapacitor. The membrane 64 is heat-resistant to a temperature of about 400° C. The amount of vacuum applied ranges from about 700 mm mercury to 0.1 mm mercury. A typical vacuum pressure is in the range of about 500 mm mercury to about 0.1 mm mercury.

In operation, the applied vacuum pressure draws collapsible membrane 64 tightly against the top of ultracapacitor 10, compressing the individual layers of the ultracapacitor against platform layer 58 while the action of compression element 80 presses against sealant-containing regions to induce sealant 46, 48 to permeate the peripheral regions of separator layers 18. The sealant contacts substantially aligned peripheral areas 86 of the facing surfaces of conductive layers 22 and 24. As the sealant cures or solidifies, it forms a strong bond to join layers 22 and 24. After sealing is complete, compression element 80 is retracted and the ultracapacitor is allowed to cool.

The following examples are illustrative of the invention.

EXAMPLE 1

Resistance measurements were taken for a variety of materials to determine their suitability as separator materials in nonaqueous ultracapacitors. The measurements were developed in experiments that were performed using a four-electrode conductance measurement cell in conjunction with an LCR resistance meter. Individual layers of separators were placed between two half cells filled with 0.65 M tetraethylammonium tetrafluoroborate. The ionic resistance of separator materials was determined as a function of the number of separator layers used and results are summarized in FIG. 5. The materials tested included a wet laid tissue with randomly oriented cellulosic fibers identified as Kimwipes® (Kimberly-Clark Corporation, Roswell, Ga.) tissues, polyester materials and Celgard, a polypropylene film from Celanese Company.

Figure 5:
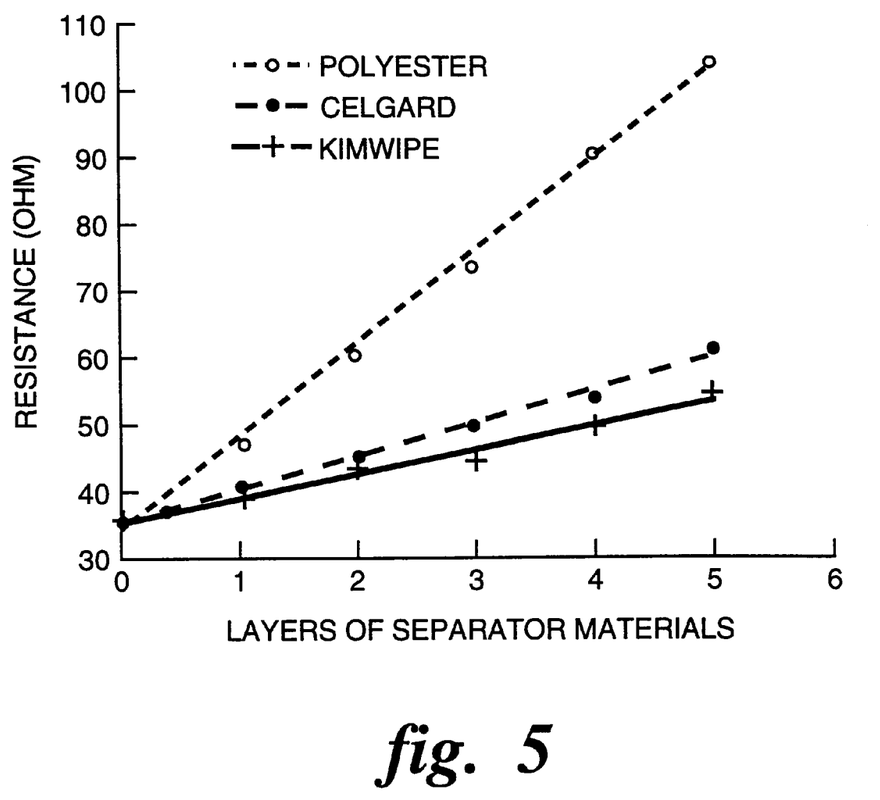
FIG. 5 is a graph of resistance as a function of layers.

FIG. 5 shows that Kimwipes® have the least ionic resistance per layer of the tested materials and is a favorable separator material based on internal resistance.

EXAMPLE 2

Figure 6:
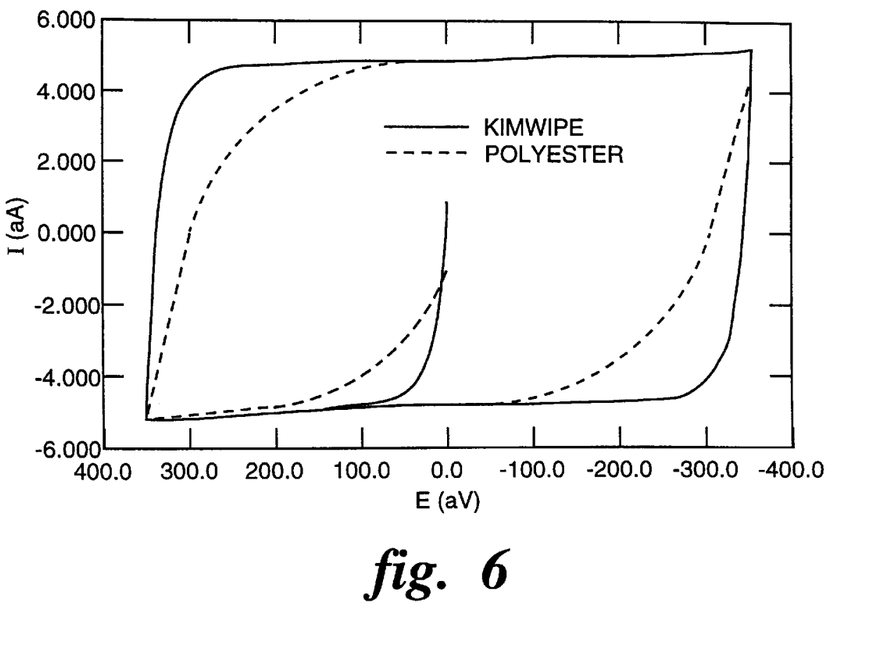
FIG. 6 shows current-potential curves for an ultracapacitor.

In this example, comparison was made between Kimwipes® and Viledon H3220, a nonwoven polyester available from Fruedenberg Nonwovens Group, Lowell, Mass., as separators in ultracapacitor devices. Current-voltage curves were developed for both types of devices and the curves are shown in FIG. 6. The geometric area of electrodes in these ultracapacitors was 6.45 cm$^2$. Current through the ultracapacitors was observed while the voltage across the two electrodes was swept from a lower negative limit (−350 mV) to a positive upper limit (+350 mV) of equal magnitude at a constant voltage sweep rate (2 mV/sec)). The voltage sweep rate was then reversed to −2 mV/ssec and the voltage swept back to the lower limit (−350 mV). The cycles were repeated until observed current waveform was reproducible from one cycle to the next.

The observed current waveform was interpreted by modeling the ultracapacitor as a series RC circuit in which a capacitance C is connected in series with a resistance R, assuming negligible leakage. Here R was considered the total resistive contribution from electrolyte and electrode structure. In practice, R is never truly zero in the series RC circuit. Thus current changes at the voltage limits are not instantaneous but occur exponentially in time. If sweeprate is chosen small enough, the current waveform approaches a square wave as shown in FIG. 6.

In both cases, the separators functioned as good electronic insulators and permitted no electrical shorting between opposed electrodes. The cell with Kimwipes® separators demonstrated a much lower time constant than the cell with polyester separators. Thus, ultracapacitors fabricated with Kimwipes® separators are able to be operated at higher power ratings.

EXAMPLE 3

A piece of Kimwipes® tissue (2.75"×2.75") was placed on a flat surface and wetted with 1M tetraethylammonium tetraflouroborate/propylene carbonate electrolyte. A carbon slurry was prepared with 4 ml of 1M tetraethylammonium tetraflouroborate/propylene carbonate, 0.04 g carbon black powder, 1.94 g activated carbon powder and 10 ml acetone. The carbon slurry was pasted onto the wetted Kimwipes® tissue by means of a doctor blade to a thickness of ~9 mil. A carbon coated Kimwipes® tissue was pressed against both sides of a 3"×3" conductive Kapton® (a carbon filled polyimide from DuPont, Wilmington, Del.) sheet to form a bipolar electrode. The bipolar electrodes were stacked in series (each of six cells) with each series having two end electrodes that were coated only on an interior side. The stack of cells was firmly held in a clamp and sealed with RTV, a silicon rubber adhesive sealant.

The electrochemical performance of the resulting 6 cell stack was characterized by a symmetrical cyclic voltammetry technique. Two end electrodes of the stack were connected to a potentiometer (EG&G 273A, EG&G Instruments, New Jersey). The potentiometer was used to control voltage applied to the stack and to measure current flow through the ultracapacitor. Current through the cell was observed while the voltage across the two electrodes was swept from a lower negative limit (−V$_t$) to a positive upper limit (+V$_t$) of equal magnitude at a constant voltage sweep rate (S). The voltage sweep rate was then reversed to −S and the voltage swept back to the lower limit (−V$_t$). The cycles were repeated until observed current waveform was reproducible from one cycle to the next.

Figure 7:
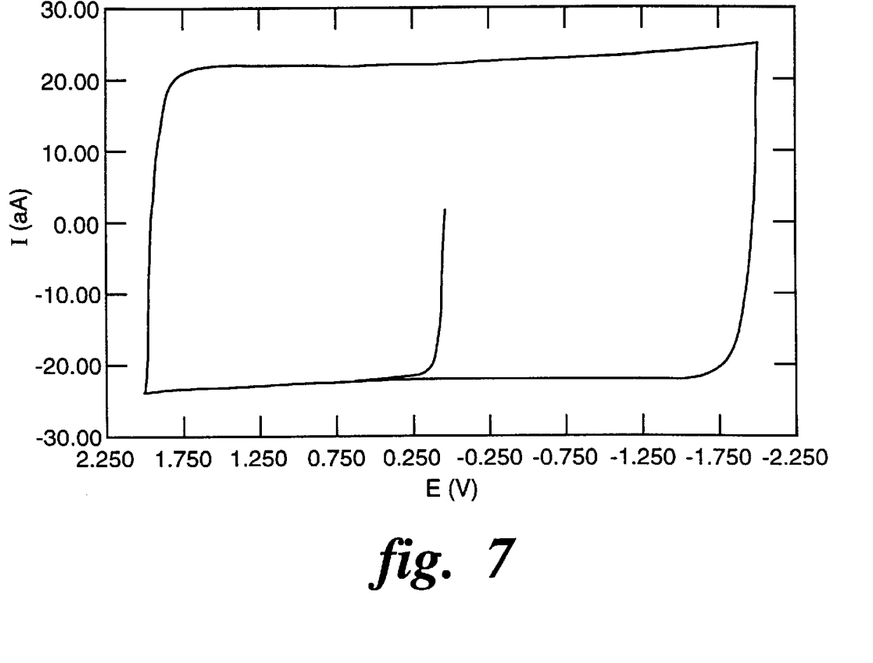
FIG. 7 shows current-potential curves for a series stack of ultracapacitor cells.

A typical result with a lower limit of −2.0V and an upper limit of 2.0V is shown in FIG. 7. In this case, the geometric area of each electrode was 7.6 in$^2$ and scan rate was 2 mV/sec. The observed current waveform was interpreted by modeling the ultracapacitor as a series RC circuit in which a capacitance C is connected in series with a resistance R, assuming negligible leakage. Here R was considered the total resistive contribution from electrolyte and electrode structure. In practice, R is never truly zero in the series RC circuit. Thus current changes at the voltage limits are not instantaneous but occur exponentially in time. If sweeprate is chosen small enough, the current waveform approaches a square wave as shown in FIG. 7.

As shown in FIG. 7, steady state current was relatively constant in both voltage sweeping directions. Little current leakage is observed to indicate that the Kimswipe® separators provide good electrical insulation between carbon electrodes. Additionally, AC equivalent series resistance of the stack was less than 1 ohm as measured with an LCR meter. This value is less than the resistance achieved with the polyester separator and is comparable to the resistance achieved with Celgard films.

The results illustrated in FIG. 7, establish that a six cell tack ultracapacitor comprising separators according to the present invention, exhibits low internal resistance and low current leakage.

Other modifications of the present invention will occur to those skilled in the art subsequent to a review of the present application. These modifications and equivalents thereof are intended to be included within the scope of this invention.

What is claimed is:

1. An ultracapacitor comprising at least one cell, said cell comprising:

two solid, nonporous current collectors, two porous electrodes separating said current collectors, a porous separator between said electrodes and an electrolyte occupying pores in said electrodes and separator, wherein said electrolyte comprises a polar aprotic organic solvent and a salt and said porous separator comprises a wet laid cellulosic tissue material.

2. The ultracapacitor of claim 1, wherein at least one of said electrodes is formed on said cellulosic tissue material.

3. A stack of ultracapacitor cells, comprising at least one of the cells of claim 2.

4. The ultracapacitor of claim 1, wherein said current collectors comprise an aluminum substrate.

5. A stack of ultracapacitor cells, comprising at least one of the cells of claim 4.

6. The ultracapacitor of claim 1, wherein said electrodes comprise carbon.

7. A stack of ultracapacitor cells, comprising at least one of the cells of claim 6.

8. The ultracapacitor of claim 1, wherein said salt comprises a quatenary ammonium salt, a hexasubstituted quanidium salt or a lithium salt.

9. A stack of ultracapacitor cells, comprising at least one of the cells of claim 8.

10. The ultracapacitor of claim 1, comprising a plurality of electrodes separating said current collectors.

11. A stack of ultracapacitor cells, comprising at least one of the cells of claim 10.

12. A stack of ultracapacitor cells, comprising at least one of the cells of claim 1.

13. A method of making an ultracapacitor, comprising:

(A) providing a multilayer cell comprising two solid, nonporous current collectors; two porous electrodes separating said current collectors; a porous separator between said electrodes and an electrolyte occupying pores in said electrodes and separator, wherein said electrolyte comprises a polar aprotic organic solvent and a salt and said porous separator comprises a wet laid cellulosic material, wherein at least one electrode is formed on said wet laid cellulosic material; and (B) sealing said cell to form said ultracapacitor.

14. A method of making a stack of ultracapacitor cells, comprising:

(A) providing in stacked relationship, a plurality of bipolar double layer ultracapacitor cells, at least one comprising porous, oppositely charged electrodes with a wet laid cellulosic separator disposed between said electrodes, wherein at least one electrode is formed on said wet laid cellulosic material;

(B) providing a non-porous current collector between each cell with each current collector having adjoining polarized electrodes of different cells bonded thereto;

(C) saturating said electrodes and separators with a polar aprotic organic solvent and a salt; and (D) sealing said cells, current collectors and separators to form said stack of ultracapacitor cells.

15. A method of making an ultracapacitor comprising the steps of:

providing at least two porous electrodes;

forming at least one of the porous electrodes on a separator comprising a wet laid cellulosic material;

providing at least two solid, nonporous current collectors;

providing an electrolyte which occupies pores in the electrodes and the separator; and sealing the electrodes, the separator, the current collectors, and the electrolyte in a cell to make the ultracapacitor.

16. The ultracapacitor of claim 15, wherein the electrolyte comprises a polar aprotic organic solvent and a salt.

* * * * *